(No Model.)
VAN ZANDT M. MOORE.
CHAIN.
No. 431,819. Patented July 8, 1890.
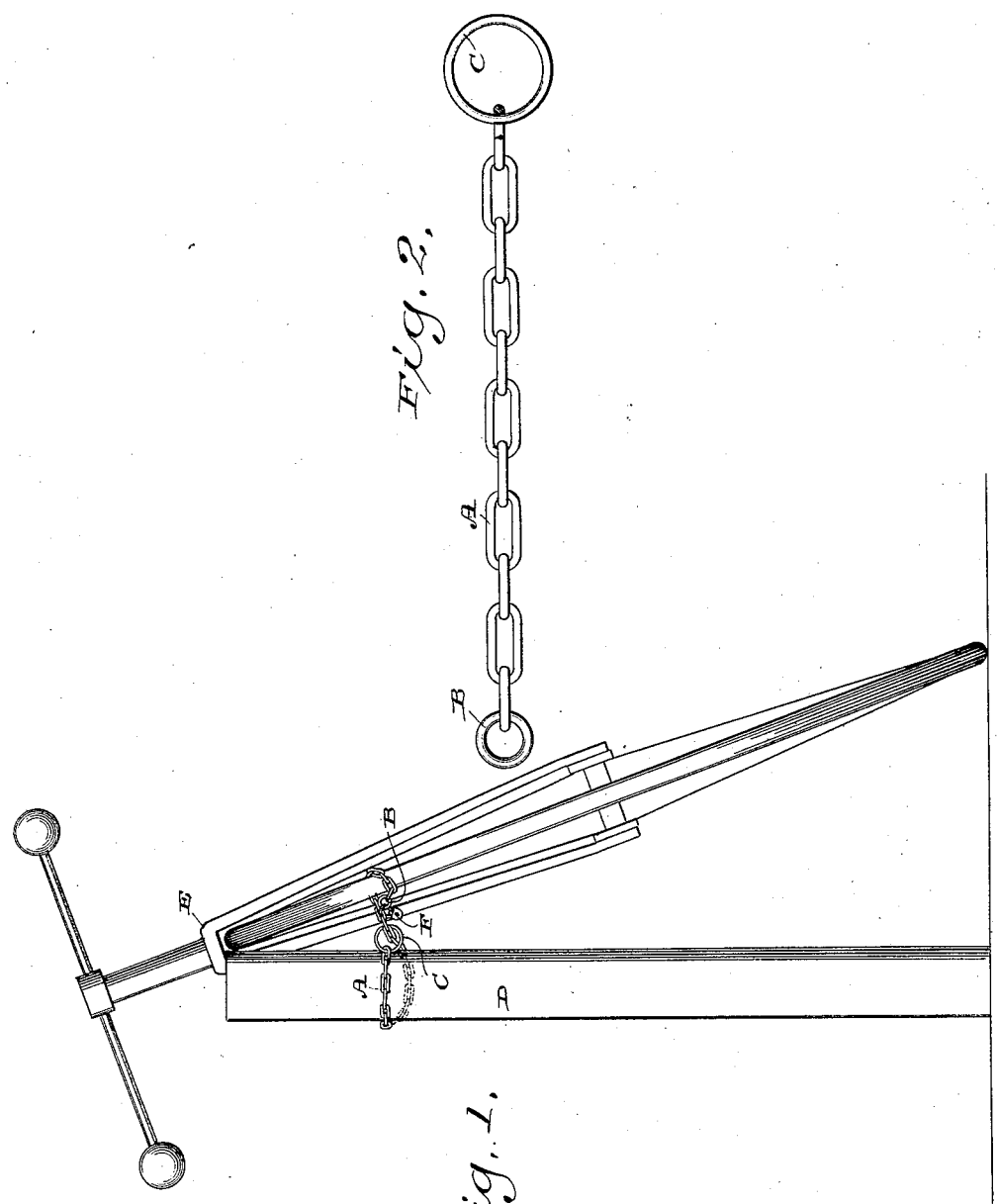
Witnesses
Geo. W. Young
N. E. Oliphant
Inventor
Van Zandt M. Moore
By H. G. Underwood
Attorney

UNITED STATES PATENT OFFICE.

VAN ZANDT M. MOORE, OF MILWAUKEE, WISCONSIN.

CHAIN.

SPECIFICATION forming part of Letters Patent No. 431,819, dated July 8, 1890.

Application filed May 26, 1890. Serial No. 353,253. (No model.)

*To all whom it may concern:*

Be it known that I, VAN ZANDT M. MOORE, of Milwaukee, in the county of Milwaukee and in the State of Wisconsin, have invented certain new and useful Improvements in Chains; and I do hereby declare that the following is a full, clear, and exact description thereof.

My invention relates to chains, being particularly designed for the use of bicyclists as a means for securing their machines to a post or other suitable support when not in use; and it consists in certain peculiarities of construction, to be hereinafter described with reference to the accompanying drawings, and subsequently claimed.

In the drawings, Figure 1 represents a bicycle secured to a post by means of my improved chain, and Fig. 2 a plan view of the chain.

Referring by letter to the drawings, A represents a series of links united to form a chain, and the last link at one end of this chain is engaged by a small ring B, while the last link at the other end of said chain is engaged by a ring C of larger diameter than the first.

In practice the small ring B is passed through the large ring C, and thus a loop is formed to encircle a post D or engage any other suitable support. The outer end of the chain is then looped around any convenient portion of a bicycle E, and said ring B and a link of the chain united by a padlock F, as is clearly illustrated in Fig. 1. Ordinarily the chain links and rings are forged, and to guard against said chain being cut I case-harden said links and rings. By the construction above described I economize in the length of chains for the purpose named, it being obvious that the two loops necessary to connect a bicycle and support in the manner specified can be made with a much shorter chain than one that is simply doubled on itself and locked at its meeting ends, as is usually the case.

Having thus described my invention, what I claim as new, and desire to secure by Letters Patent, is—

1. As an improved article of manufacture, a bicycle-securing chain having a small ring at one end and a ring of larger diameter than the first at the other end, substantially as set forth.

2. As an improved article of manufacture, a bicycle-securing chain comprising a series of forged and case-hardened links and two rings of different diameters constituting the ends of said chain, substantially as set forth.

In testimony that I claim the foregoing I have hereunto set my hand at Milwaukee, in the county of Milwaukee and State of Wisconsin, in presence of two witnesses.

VAN ZANDT M. MOORE.

Witnesses:
H. G. UNDERWOOD,
LAWSON SCOTT.